US010540501B2

United States Patent
Khatri et al.

(10) Patent No.: US 10,540,501 B2
(45) Date of Patent: Jan. 21, 2020

(54) RECOVERING AN INFORMATION HANDLING SYSTEM FROM A SECURE BOOT AUTHENTICATION FAILURE

(71) Applicant: DELL PRODUCTS, L.P., Round Rock, TX (US)

(72) Inventors: Mukund P. Khatri, Austin, TX (US); William C. Munger, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 71 days.

(21) Appl. No.: 15/612,902

(22) Filed: Jun. 2, 2017

(65) Prior Publication Data
US 2018/0349607 A1    Dec. 6, 2018

(51) Int. Cl.
G06F 9/00     (2006.01)
G06F 21/57    (2013.01)
G06F 9/4401   (2018.01)

(52) U.S. Cl.
CPC .......... G06F 21/575 (2013.01); G06F 9/4406 (2013.01)

(58) Field of Classification Search
CPC .................................................. G06F 21/575
USPC ........................................................... 713/2
See application file for complete search history.

(56) References Cited

U.S. PATENT DOCUMENTS

| | | | | |
|---|---|---|---|---|
| 8,887,144 B1 * | 11/2014 | Marr | ........................ | G06F 8/65 717/168 |
| 2004/0025036 A1 * | 2/2004 | Balard | ..................... | G06F 21/10 713/189 |
| 2005/0021968 A1 * | 1/2005 | Zimmer | ................ | G06F 21/572 713/176 |
| 2006/0026429 A1 * | 2/2006 | Kudo | ..................... | G06F 21/575 713/173 |
| 2006/0123223 A1 * | 6/2006 | Mayfield | ............... | G06F 9/4403 713/2 |
| 2006/0179308 A1 * | 8/2006 | Morgan | ................ | G06F 21/575 713/168 |
| 2009/0319806 A1 * | 12/2009 | Smith | .................... | G06F 21/575 713/193 |
| 2009/0327684 A1 * | 12/2009 | Zimmer | ................ | G06F 21/575 713/2 |
| 2009/0327741 A1 * | 12/2009 | Zimmer | ................ | G06F 21/575 713/183 |
| 2010/0115284 A1 | 5/2010 | Hahn et al. | | |
| 2010/0169633 A1 * | 7/2010 | Zimmer | ................ | G06F 21/575 713/2 |
| 2011/0131447 A1 * | 6/2011 | Prakash | ................ | G06F 21/572 714/19 |

(Continued)

*Primary Examiner* — Volvick Derose
(74) *Attorney, Agent, or Firm* — Isidore PLLC (57) ABSTRACT

A method, information handling system (IHS) and a recovery system for recovering an IHS from a secure boot authentication failure. The method includes retrieving, via a processor from a first memory device, a first unified extensible firmware interface (UEFI) driver associated with a first component/device of the IHS. The method further includes determining, via a secure boot process, if the first UEFI driver is an authenticated UEFI driver. In response to determining that the first UEFI driver is not an authenticated driver, a previously validated UEFI driver corresponding to the first component/device is retrieved from a second memory device. The method further includes loading the previously validated UEFI driver.

20 Claims, 8 Drawing Sheets

(56) References Cited

U.S. PATENT DOCUMENTS

| | | | |
|---|---|---|---|
| 2012/0124356 A1* | 5/2012 | Datta | G06F 21/575 |
| | | | 713/2 |
| 2012/0167205 A1* | 6/2012 | Ghetie | G06F 21/572 |
| | | | 726/22 |
| 2013/0047031 A1* | 2/2013 | Tabone | G06F 11/1417 |
| | | | 714/15 |
| 2013/0290778 A1* | 10/2013 | Soderlund | G06F 11/1417 |
| | | | 714/15 |
| 2014/0250290 A1* | 9/2014 | Stahl | G06F 21/575 |
| | | | 713/2 |
| 2015/0019850 A1* | 1/2015 | Rivera | G06F 21/572 |
| | | | 713/1 |
| 2015/0378846 A1* | 12/2015 | Hagiwara | G06F 21/572 |
| | | | 714/19 |
| 2016/0012232 A1* | 1/2016 | Butcher | G06F 21/575 |
| | | | 713/2 |
| 2016/0055068 A1* | 2/2016 | Jeansonne | G06F 21/572 |
| | | | 714/15 |
| 2016/0070913 A1* | 3/2016 | Kulkarni | G06F 21/575 |
| | | | 713/2 |
| 2016/0147996 A1 | 5/2016 | Martinez | |
| 2016/0180094 A1* | 6/2016 | Dasar | G06F 21/575 |
| | | | 714/36 |
| 2017/0010875 A1 | 1/2017 | Martinez et al. | |
| 2017/0010884 A1* | 1/2017 | Liu | G06F 8/66 |
| 2017/0098084 A1 | 4/2017 | Kulkarni et al. | |
| 2018/0239900 A1* | 8/2018 | Stewart | G06F 11/3604 |

* cited by examiner

FIG. 8

RECOVERING AN INFORMATION HANDLING SYSTEM FROM A SECURE BOOT AUTHENTICATION FAILURE

BACKGROUND

1. Technical Field

The present disclosure generally relates to information handling systems and in particular to recovering an information handling system from a secure boot authentication failure.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications.

Unified extensible firmware interface (UEFI) is a specification that defines a software interface between an operating system and platform firmware. UEFI replaces the basic input/output system (BIOS) found on older information handling systems. UEFI provides a standard architecture and data structure to manage initialization and configuration of devices, booting of platform resources, and passing of control to the operating system. The UEFI specification allows for the extension of platform firmware by loading UEFI driver and application images.

UEFI secure boot is a process that provides increased security during the boot process by preventing the loading of drivers or OS loaders that are not signed with an acceptable digital signature. When UEFI secure boot is enabled, platform firmware uses a set of public keys to determine which UEFI drivers, images, and OS loaders are authorized to execute. Unfortunately, if the UEFI secure boot process fails to authorize drivers, images, or OS loaders that are necessary for booting, the information handling system does not boot, resulting in a non-functioning information handling system.

BRIEF SUMMARY

Disclosed are a method, an information handling system (IHS), and a recovery system for recovering an IHS from a secure boot authentication failure.

According to one embodiment, the method includes retrieving, via a processor from a first memory device, a first unified extensible firmware interface (UEFI) driver associated with a first component/device of the IHS. The method further includes determining, via a secure boot process, if the first UEFI driver is an authenticated UEFI driver. In response to determining that the first UEFI driver is not an authenticated driver, a previously validated UEFI driver corresponding to the first component/device is retrieved from a second memory device. The method further includes loading the previously validated UEFI driver to support booting an operating system (OS) of the IHS.

According to another embodiment, the IHS includes a processor that is communicatively coupled to both a first memory device and a second memory device. The processor has firmware executing thereon for recovering the IHS from a secure boot authentication failure. The firmware configures the processor to retrieve from the first memory device, a first unified extensible firmware interface (UEFI) driver associated with a first component/device of the IHS and to determine, via a secure boot process, if the first UEFI driver is an authenticated UEFI driver. In response to determining that the first UEFI driver is not an authenticated driver, the processor retrieves, from the second memory device, a previously validated UEFI driver corresponding to the first component/device. The previously validated UEFI driver is loaded to support booting an operating system (OS) of the IHS.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide a method, an information handling system (IHS), and a recovery system for recovering an IHS from a secure boot authentication failure.

The method includes retrieving, via a processor from a first memory device, a first unified extensible firmware interface (UEFI) driver associated with a first component/device of the IHS. The method further includes determining, via a secure boot process, if the first UEFI driver is an authenticated UEFI driver. In response to determining that the first UEFI driver is not an authenticated driver, a previously validated UEFI driver corresponding to the first component/device is retrieved from a second memory device. The method further includes loading the previously validated UEFI driver to support booting an operating system (OS) of the IHS.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Figure 1:
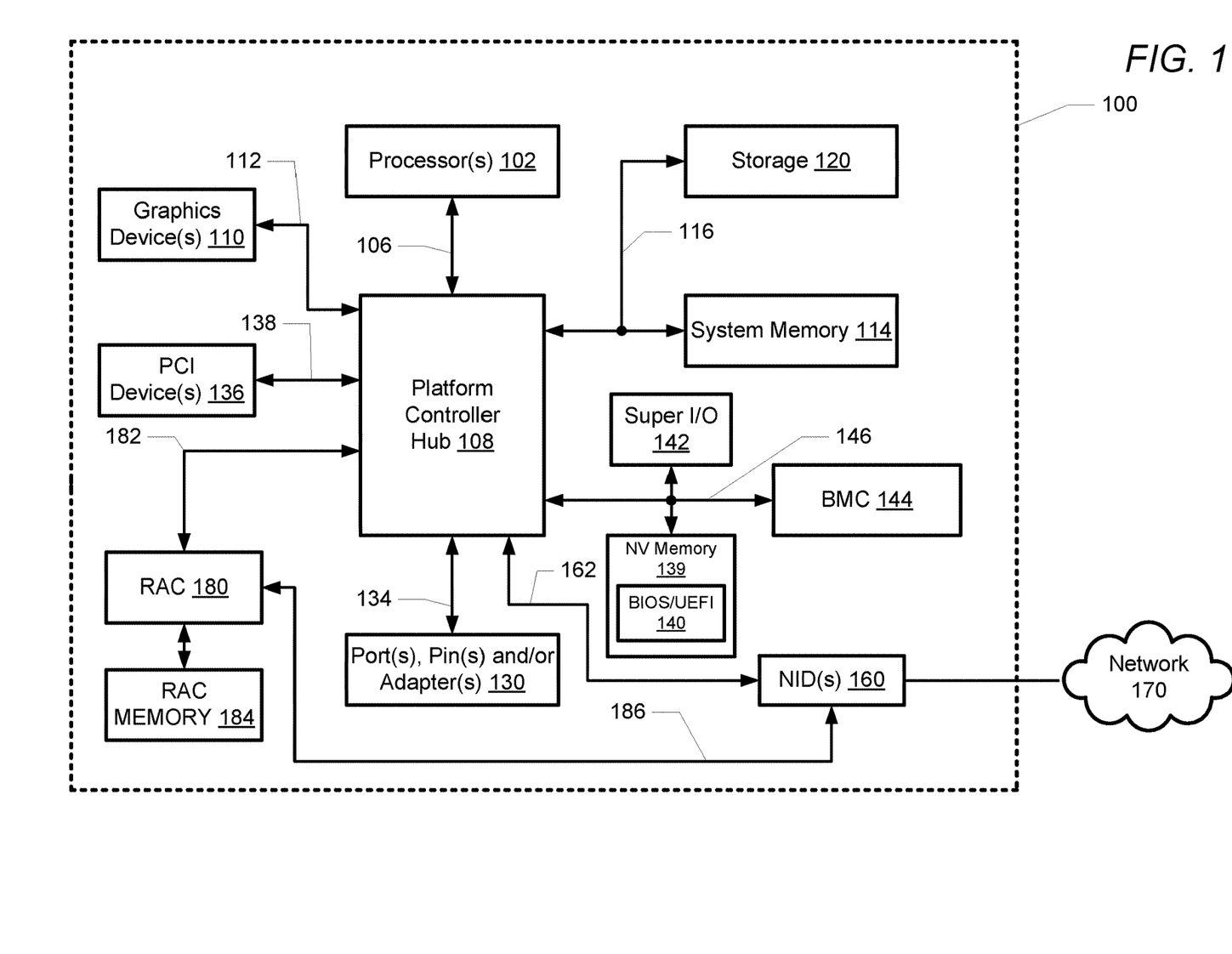
FIG. 1 illustrates one example of an IHS within which various aspects of the disclosure can be implemented, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, an example of an IHS 100 is shown. IHS 100 includes one or more processor(s) 102. In various embodiments, IHS 100 may be a single-processor system including one processor 102, or a multi-processor system including two or more processor(s) 102 (e.g., two, four, eight, or any other suitable number). Processor(s) 102 includes any processor capable of executing program instructions.

Processor(s) 102 are coupled to platform controller hub (PCH) or chipset 108 via front-side bus 106. PCH 108 may be configured to coordinate I/O traffic between processor(s) 102 and other components. For example, in this particular implementation, PCH 108 is coupled to various IHS components such as graphics device(s) 110 (e.g., one or more video cards or adaptors, etc.) via graphics bus 112 (e.g., an Accelerated Graphics Port or AGP bus, a Peripheral Component Interconnect (PCI) bus, etc.). PCH 108 is also coupled to system memory 114 via memory bus 116. System memory 114 may be configured to store program instructions and/or data, accessible by processor(s) 102. In various embodiments, system memory 114 may be implemented using any suitable memory technology, such as static RAM (SRAM), synchronous dynamic RAM (SDRAM), nonvolatile/Flash-type memory, or any other type of memory.

PCH 108 is coupled by memory bus 116 to storage device or storage 120 within which can be stored one or more software and/or firmware modules and/or data (not specifically shown). In one embodiment, storage 120 can be a hard drive or a solid state drive. The one or more software and/or firmware modules within storage 120 can be loaded into system memory 114 during operation of IHS 100.

PCH 108 is also coupled to one or more PCI devices 136 (e.g., modems, network cards, sound cards, video cards, shared memory etc.) via PCI bus 138. PCH 108 is further coupled to port(s), pin(s), and/or adapter(s) 130 over bus 134. Generally, PCH 108 may be configured to handle various I/O operations, and PCH 108 may provide interfaces such as, for instance, Universal Serial Bus (USB), audio, serial, parallel, Ethernet, and other interfaces, via port(s), pin(s), and/or adapter(s) 130 over bus 134. For example, PCH 108 may be configured to allow data to be exchanged between IHS 100 and other devices, such as other IHSs attached to a network. In various embodiments, PCH 108 may support communication via wired or wireless general data networks, such as any suitable type of Ethernet network, via telecommunications/telephony networks, such as analog voice networks or digital fiber communications networks, via storage area networks (SAN) such as Fiber Channel SANs, or via any other suitable type of network and/or protocol.

PCH 108 may also enable connection to one or more input devices, such as keyboards, keypads, touch screens, scanning devices, voice or optical recognition devices, or any other devices suitable for entering or retrieving data. Multiple I/O devices may be present in IHS 100. In some embodiments, I/O devices may be separate from IHS 100 and may interact with IHS 100 through a wired or wireless connection. PCH 108 is coupled to a non-volatile (NV) storage or memory device 139 via Low Pin Count (LPC) bus 146. NV memory 139 stores a basic input output system/unified extensible firmware interface (BIOS/UEFI) 140. PCH 108 is also coupled to super I/O Controller 142 and baseboard management controller (BMC) 144 via LPC bus 146.

BIOS/UEFI 140 includes program instructions stored thereon typically as BIOS or UEFI images. Those instructions may be usable by processor(s) 102 to initialize and test other hardware components and/or to load an Operating System (OS) onto IHS 100. As such, (BIOS/UEFI) 140 may include a firmware interface that allows processor(s) 102 to load and execute certain firmware, as described in more detail below. In some cases, such firmware may include program code that is compatible with the Unified Extensible Firmware Interface (UEFI) specification, although other types of firmware may be used.

IHS 100 further includes a board management controller (BMC) 144 that is in communication with NV memory 139 that can have program instructions stored thereon that are usable by processors(s) 102 to enable remote management of IHS 100. For example, BMC 144 may enable a user to discover, configure, and manage BMC 144, setup configuration options, resolve and administer hardware or software problems, etc. Additionally or alternatively, BMC 144 may include one or more BMC firmware volumes, each volume having one or more firmware files used by the UEFI firmware interface to initialize and test components of IHS 100. IHS 100 also includes a super I/O controller 142 that combines interfaces for a variety of lower bandwidth or low data rate devices. Those devices may include, for example, floppy disks, parallel ports, a keyboard and mouse and other devices.

In some cases, IHS 100 may be configured to access different types of computer-accessible media separate from system memory 114. Generally speaking, a computer-accessible memory device may include any tangible, non-transitory storage media or memory media such as electronic, magnetic, or optical media (e.g., magnetic disk, a hard drive, a CD/DVD-ROM, a Flash memory, etc.) coupled to IHS 100 via PCH 108. Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

IHS 100 further includes one or more network interface devices (NID(s)) 160 coupled to PCH 108 via PCI bus 162. NID(s) 160 enables IHS 100 to communicate and/or interface with other devices, services, and components that are located external to IHS 100. These devices, services, and components can interface with IHS 100 via an external network, such as example network 170, using one or more communication protocols. In one embodiment, a customer provisioned system/platform can comprise multiple devices located across a distributed network, and NID 160 enables IHS 100 to be connected to these other devices. Network 170 can be a local area network, wide area network, personal area network, and the like, and the connection to and/or between network 170 and IHS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet.

IHS 100 further includes a remote access controller (RAC) 180 coupled via a PCI bus 182 to PCH 108. RAC 180 provides management functions that allow an administrator to deploy, monitor, manage, configure, update, troubleshoot and remediate IHS 100. RAC 180 is also coupled to RAC memory 184. In one embodiment, RAC memory 184 can be shared with processor(s) 102. RAC 180 is also communicatively coupled to NID(s) 160 via a sideband bus 186.

RAC 180 monitors and controls the operation of IHS 100 and other systems and devices communicatively coupled to IHS 100. RAC 180 can also perform configuration and remote control of other connected IHSs. Certain software and/or firmware modules stored in RAC memory 184 can be executed by RAC 180. Processor(s) 102 and RAC 180 include specific firmware that enables processor(s) 102 and RAC 180 to perform the various functions described herein.

In an embodiment, a motherboard is provided that is configured to provide structural support, power, and electrical connectivity between the various aforementioned components. Such a motherboard may include multiple connector sockets in various configurations, adapted to receive pluggable circuit cards, component chip packages, etc.

A person of ordinary skill in the art will appreciate that IHS 100 is merely illustrative and is not intended to limit the scope of the disclosure described herein. In particular, any computer system and/or device may include any combination of hardware or software capable of performing certain operations described herein. For instance, although IHS 100 is illustrated following a first type architecture, various systems and methods described herein may be adapted to work with any other architecture having a different chipset and/or RAC configuration. In other implementations, one or more of the devices or components shown in FIG. 1 may be absent, or one or more other components may be added. Accordingly, systems and methods described herein may be implemented or executed with other computer system configurations. In addition, the operations performed by the illustrated components may, in some embodiments, be performed by fewer components or distributed across additional components. Similarly, in other embodiments, the operations of some of the illustrated components may not be performed and/or other additional operations may be available.

Figure 2A:
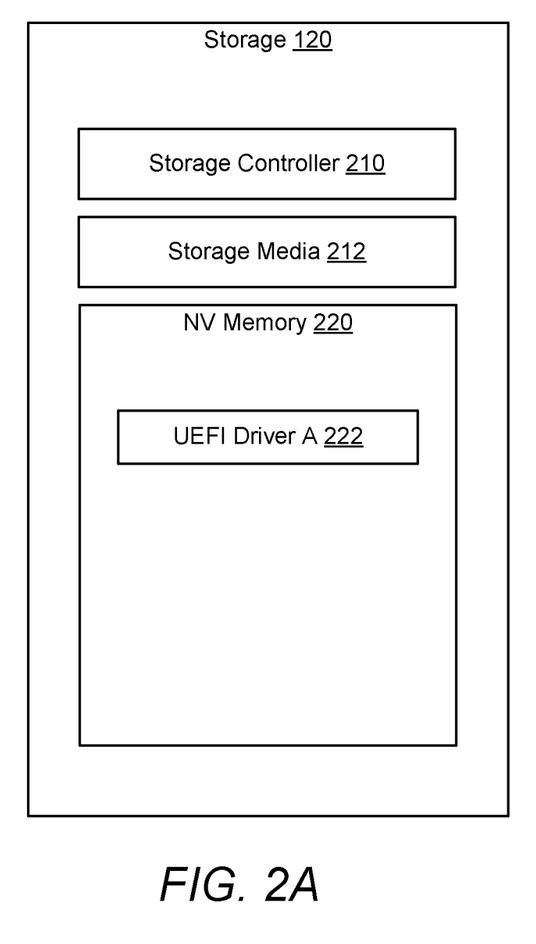
FIG. 2A illustrates an example storage device, in accordance with one embodiment.

In the description of each of the following figures, reference is also made to specific components illustrated within the preceding figures. With reference now to FIG. 2A, one embodiment of storage 120 of IHS 100 is shown. Storage 120 includes a storage controller 210, storage media 212 and non-volatile (NV) memory 220. Storage controller 210 can manage and control the operation of storage 120. Storage media 212 can include hard drives or solid-state drives. NV memory 220 is a data storage device that retains its stored data even when electrical power is removed. As illustrated, NV memory 220 can contain UEFI driver A 222. UEFI driver A 222 can be loaded into system memory 114 during start-up or booting of IHS 100 in order to facilitate the operation of storage 120 within IHS 100.

Figure 2B:
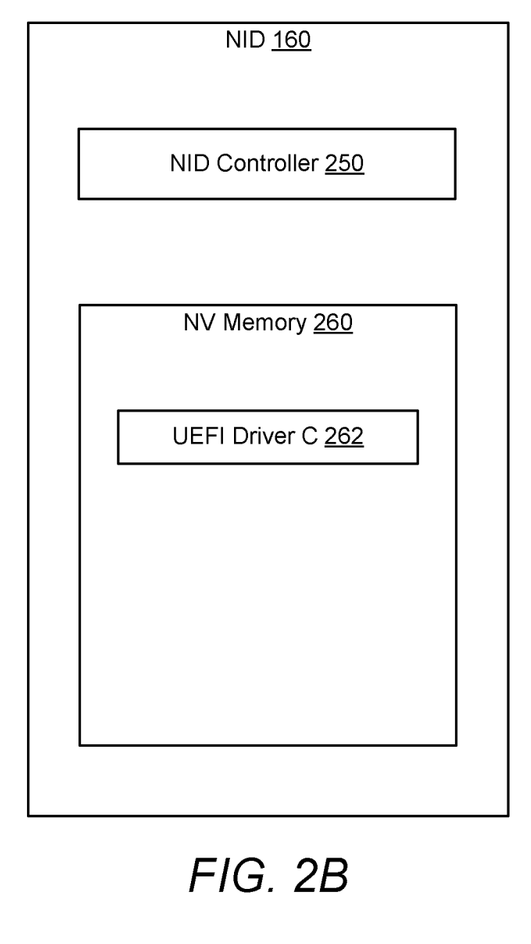
FIG. 2B illustrates an example network interface device, in accordance with one embodiment.

FIG. 2B illustrates one embodiment of NID 160. NID 160 includes NID controller 250 and NV memory 260. NID controller 250 can manage and control the operation of NID 160. NV memory 260 can contain UEFI driver C 262. UEFI driver C 262 can be loaded into system memory 114 during start-up or booting of IHS 100 in order to facilitate the operation of NID 160 within IHS 100.

Figure 3A:
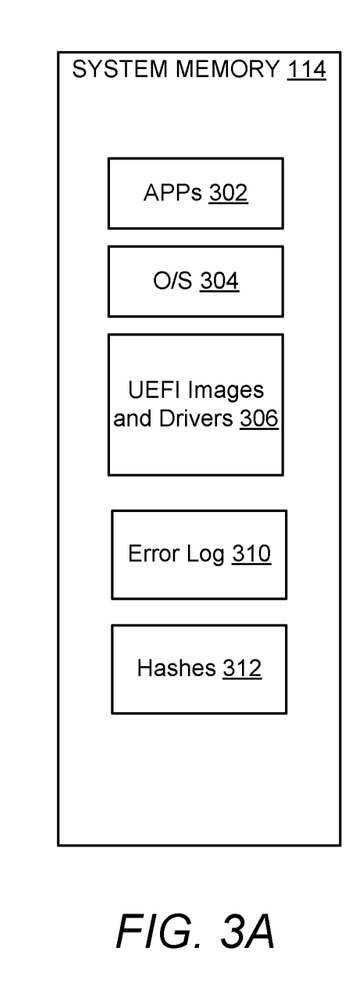
FIG. 3A illustrates example contents of a system memory in an IHS, in accordance with one embodiment.

With reference now to FIG. 3A, one embodiment of example contents of system memory 114 of IHS 100 is shown. System memory 114 includes data, software, and/or firmware modules, including application(s) 302, operating system (O/S) 304, UEFI images and drivers 306, error log 310 and hashes 312. System memory 114 can also include other data, software, and/or firmware modules. UEFI images and drivers 306 are program instructions usable by processor 102 to boot or load OS 304 onto IHS 100 and to facilitate communications and operation of other components of IHS 100. Error log 310 contains error messages generated by processor 102 when problems or errors occur during booting of IHS 100. Hashes 312 are values generated by a hash function of current or real time UEFI images and drivers (e.g. UEFI driver A 222, UEFI driver C 262 and UEFI images 330) retrieved from other memory devices of IHS 100.

Figure 3B:
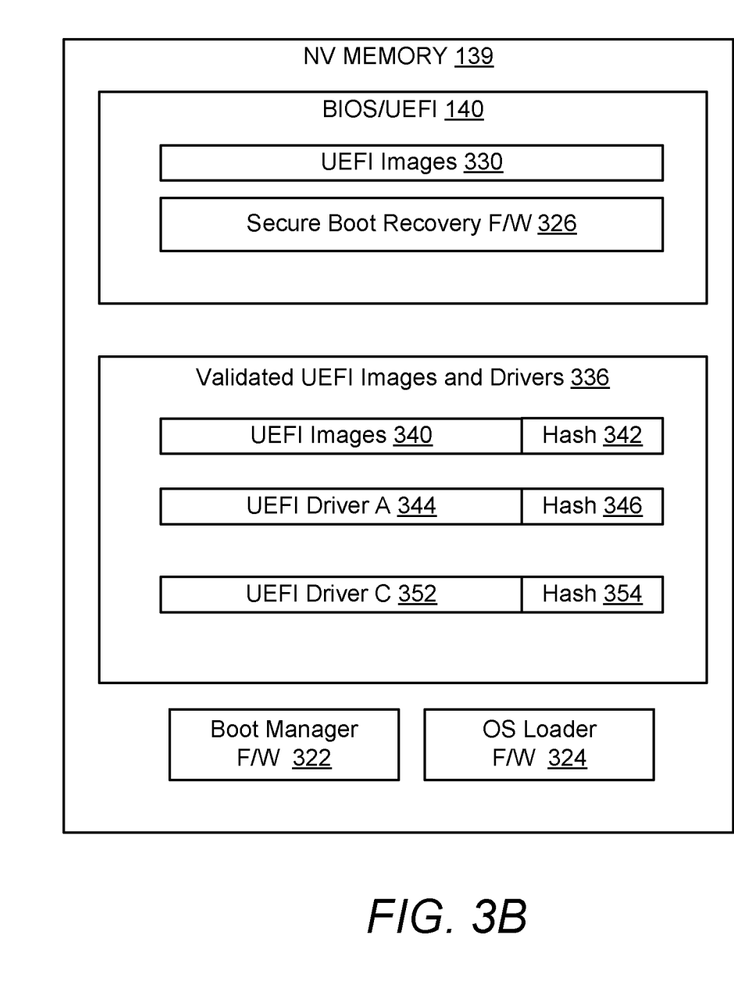
FIG. 3B illustrates example contents of a non-volatile storage device, in accordance with one embodiment.

Turning to FIG. 3B, one embodiment of example contents of NV memory 139 of IHS 100 is shown. NV memory 139 includes BIOS/UEFI 140, boot manager firmware (F/W) 322 and OS loader F/W 324. BIOS/UEFI 140 can include secure boot recovery F/W 326 and current non-validated UEFI images 330 that can be loaded during system start-up or booting by IHS 100. The booting process involves several phases including a driver execution environment (DXE) phase, a boot device select (BDS) phase, a transient system load (TSL) phase and runtime (RT). During the booting process UEFI images and drivers are retrieved from components of IHS 100 and loaded to system memory 114. Secure boot recovery F/W 326 operates during the driver execution environment (DXE) phase of booting and facilitates the recovery of IHS 100 from a secure boot authentication failure. Secure boot recovery F/W 326 performs the processes presented in the flowcharts of FIGS. 5, 6, 7 and 8. NV memory 139 further includes validated UEFI images and drivers 336, which are UEFI images and drivers that have been previously confirmed or validated to be known valid UEFI images and drivers. In one embodiment, validated UEFI images and drivers 336 can be stored to NV memory 139 during a provisioning process such as during manufacturing. In another embodiment, a system administration can verify the validity of UEFI images and drivers to generate validated UEFI images and drivers 336.

Validated UEFI images and drivers 336 include UEFI images 340 and associated hashes 342. Hashes 342 are unique values generated by a hash function. Hashes can be used to uniquely identify information and data. In one embodiment, the hash function can be a secure hash function or secure hash algorithm (SHA) such as the SHA-1 hash function. According to one aspect of the disclosure, hashes of the known valid or approved UEFI images and drivers are generated and then stored along with the valid UEFI images and drivers for later use. Validated UEFI images and drivers 336 further include UEFI driver A 344 with associated hash 346, UEFI driver C 352 with associated hash 354. Validated UEFI driver A 344 corresponds to the non-validated UEFI driver A 222. Validated UEFI driver C 352 corresponds to the non-validated UEFI driver C 262.

During booting, an EFI driver dispatcher loads device drivers such as UEFI driver A 222 and validated UEFI images and drivers 336. Boot manager 322 operates during the boot device select (BDS) phase of booting and facilitates the loading of OS loader F/W 324. OS loader F/W 324 operates during the transient system load (TSL) phase of booting and facilitates the loading of OS 304.

Figure 4:
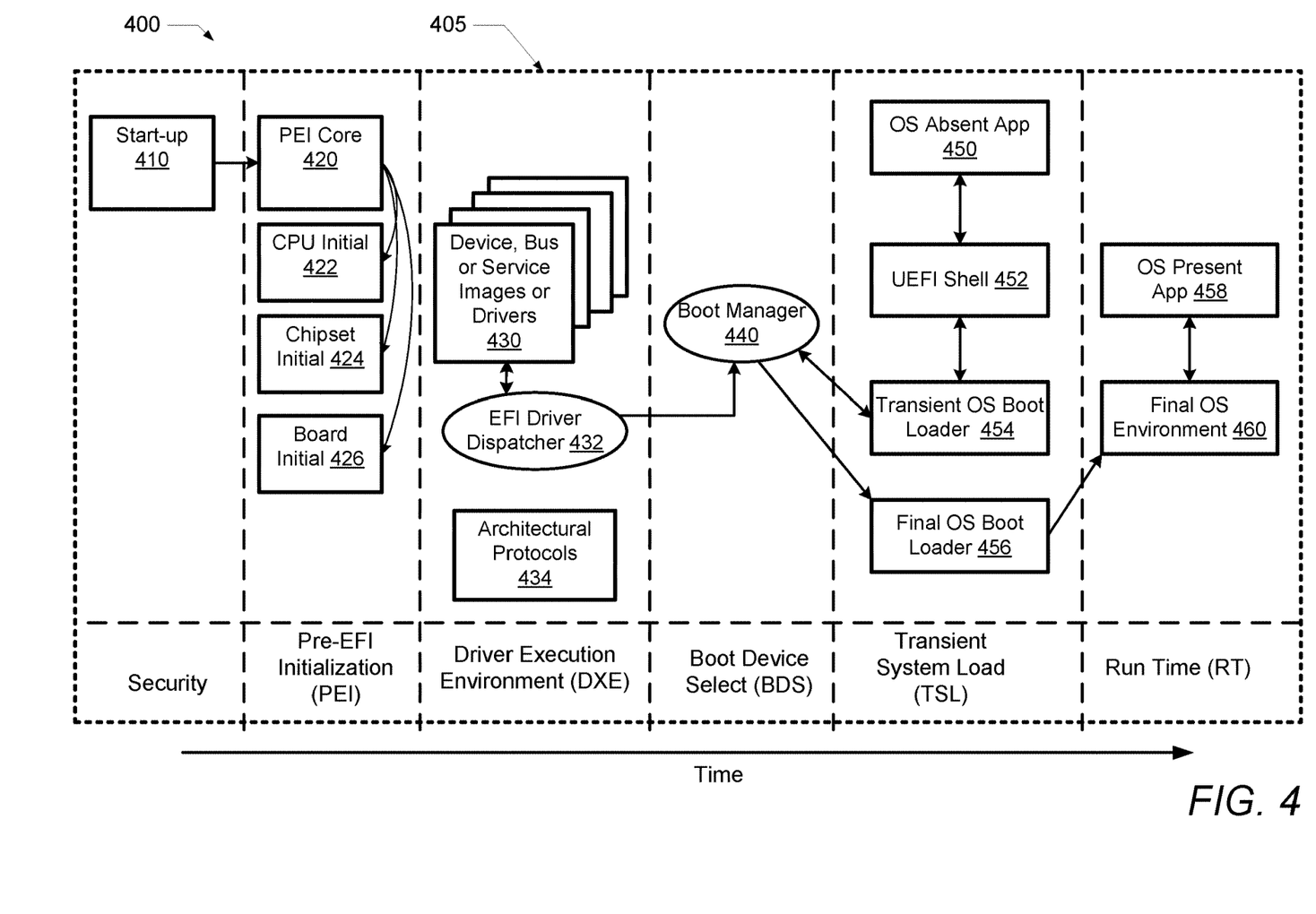
FIG. 4 illustrates a timeline of a boot-up operation or process for an IHS, in accordance with one embodiment.

FIG. 4 illustrates a timeline 400 of a boot operation or process 405 for IHS 100. Timeline 400 begins at start-up 410, which involves a security phase, where processor 102 is started and the boot process is initiated. At a pre-extensible firmware interface initialization (PEI) phase, a PEI core operation 420 is performed. During the PEI core operation 420, memory is initialized and firmware volume locations are described in hand off blocks. Next, a CPU initialization 422 of processor 102 occurs, followed by chipset initialization 424 and then motherboard initialization 426. At a driver execution environment (DXE) phase, extensible firmware interface (EFI) driver dispatcher 432 retrieves device, bus or service images or drivers 430. The retrieved images and/or drivers depend upon the architectural protocols 434 associated with IHS 100. During the DXE phase, if a secure boot process or mode is enabled, an authentication check of UEFI images 430 occurs. If the secure boot process or mode is not enabled, an authentication check of device, bus or service images or drivers 430 does not occur during the DXE phase. One or more of the described embodiments occurs during the DXE phase. The secure boot process or policy prevents the loading of drivers or images that are not signed with an acceptable digital signature. When secure boot is enabled, platform firmware uses a set of public keys stored in the firmware to determine which UEFI drivers, images, and OS loaders are authorized to execute.

EFI driver dispatcher 432 transmits device, bus or service images or drivers 430 to boot manager 440 during the boot device selection (BDS) phase. At the transient system load (TSL) phase, either transient OS boot loader 454 or final OS boot loader 456 loads device, bus or service images or drivers 430 to start OS 304. If transient OS boot loader 454 is selected to run, then IHS 100 enters a UEFI shell environment 452 and triggers OS absent application 450 to run. If final OS boot loader 456 is selected to run, IHS 100 loads OS 304, enters the final OS environment 460, and triggers OS present application 458 to run during the run time phase.

In one embodiment, secure boot recovery firmware 326, executing on processor 102, retrieves, from storage NV memory 220, a UEFI driver (e.g., UEFI driver A 222) associated with a detected component/device (e.g., storage 120). Processor 102 determines, via a secure boot process, if the UEFI driver is an authenticated UEFI driver. In response to determining that the UEFI driver is not an authenticated driver, processor 102 retrieves, from NV memory device 139, a previously validated UEFI driver (e.g., UEFI driver A 344) corresponding to the component/device. Processor 102 loads the previously validated UEFI driver (i.e. UEFI driver A 344) with an operating system (OS) 304 of the IHS.

FIGS. 5, 6, 7 and 8 illustrate flowcharts of exemplary methods 500, 600, 700 and 800 by which processor 102 within the preceding figures performs different aspects of the processes that enable the one or more embodiments of the disclosure. Generally, method 500 represents a method for identifying valid UEFI images and drivers during a provisioning process. Method 600 represents a method for updating the current valid UEFI images and drivers with new validated UEFI images and drivers. Method 700 represents a method for recovering an IHS from a secure boot authentication failure. Method 800 represents another method for recovering an IHS from a secure boot authentication failure.

The description of methods 500, 600, 700 and 800 is provided with general reference to the specific components illustrated within the preceding FIGS. 1-4. Generally, methods 500, 600, 700 and 800 are described as being implemented via processor 102 and particularly the execution of code provided by secure boot recovery firmware 326 acting within processor 102. It is however appreciated that certain aspects of the described methods may be implemented via other processing devices and/or execution of other code.

Figure 5:
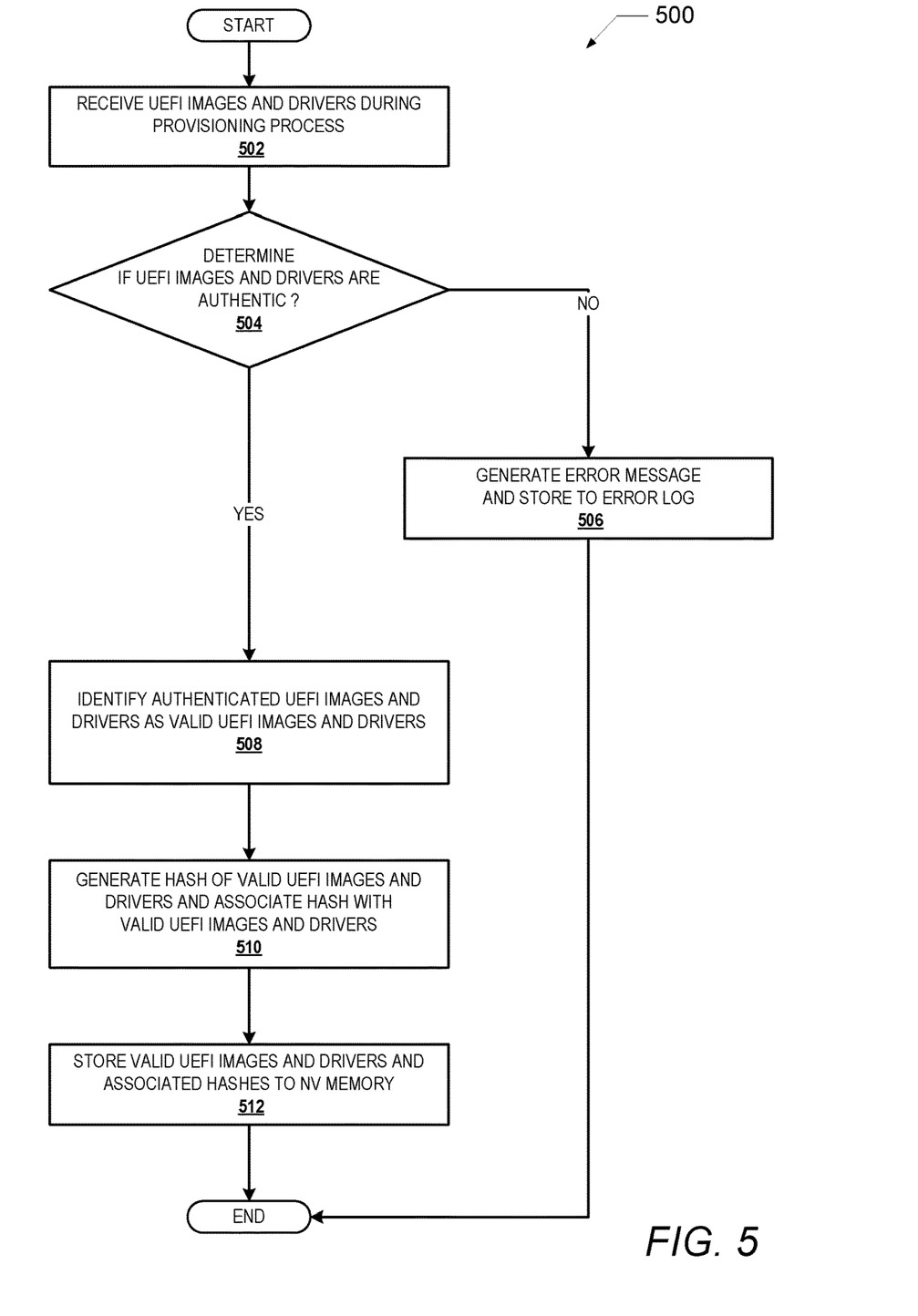
FIG. 5 is a flow chart illustrating one example of a method for identifying valid UEFI images and drivers during a provisioning process, according to one or more embodiments.

Referring to the flow chart of FIG. 5, method 500 begins at the start block and proceeds to block 502 where processor 102 receives UEFI images and drivers during a provisioning process, such as during manufacturing. Processor 102 can receive the UEFI images and drivers via ports, pins and adaptors 130 or via network 170. Processor 102 determines if the received UEFI images and UEFI drivers are operational and authentic using a secure boot process or policy (decision block 504). The secure boot policy uses a set of public keys to authenticate the UEFI images and drivers. Only UEFI images and drivers that satisfy the secure boot policy are designated to be authentic. In response to all of the UEFI images and drivers not being authenticated, processor 102 generates an error message and stores the error message to error log 310 (block 506). Method 500 then ends.

In response to all of the UEFI images and drivers being authenticated, processor 102 identifies the UEFI images and drivers as known valid UEFI images and drivers (block 508). Processor 102 generates a hash of each of the UEFI images and drivers and associates the hash with their respective UEFI images and drivers (block 510). At block 512, processor 102 stores the valid UEFI images, drivers and associated hashes to NV memory 139 as validated UEFI images and drivers 336 (e.g., UEFI images 340/hash 342, UEFI driver A 344/hash 346 and UEFI driver C 352/hash 354). Method 500 concludes at the end block.

Figure 6:
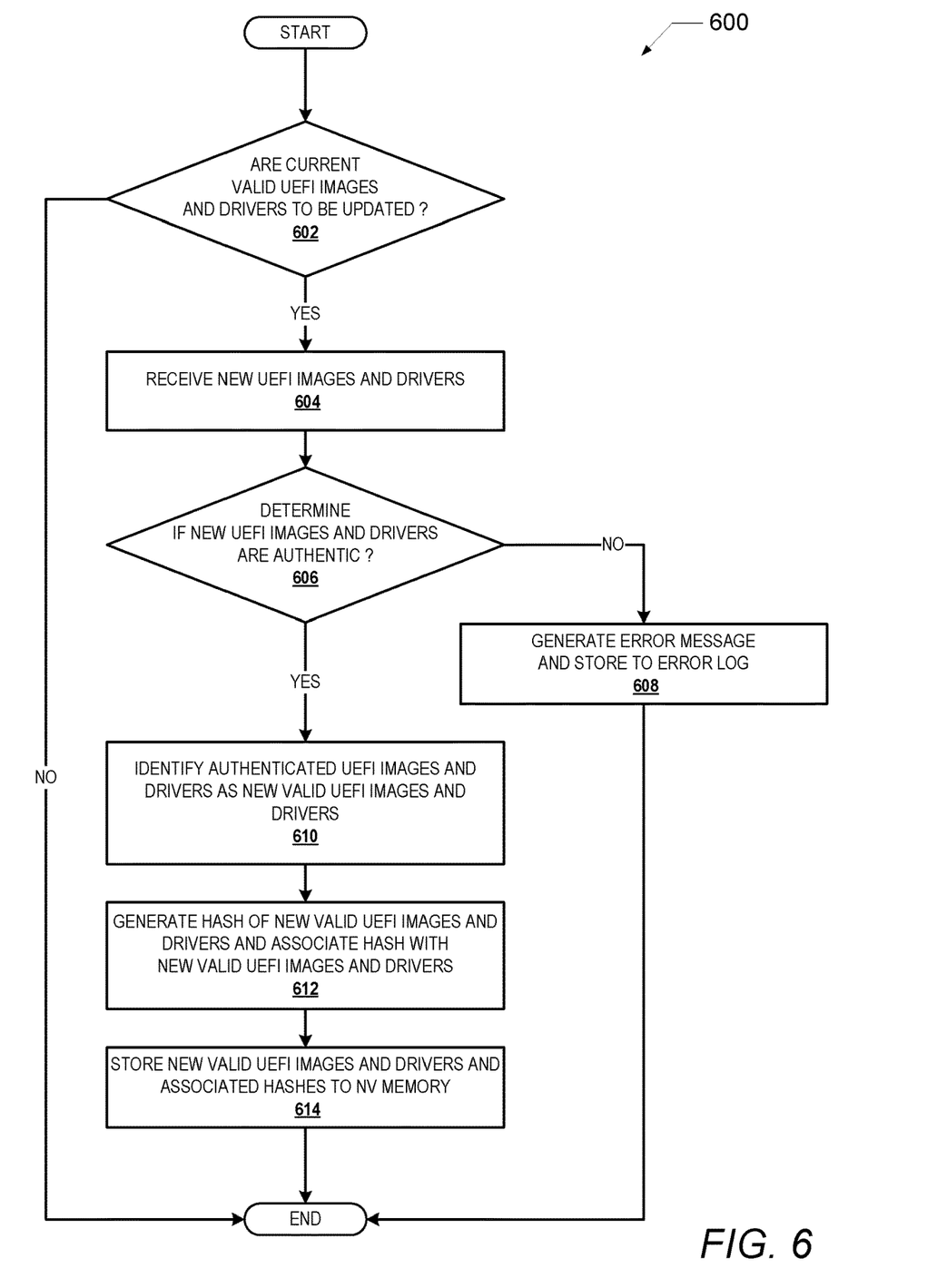
FIG. 6 is a flow chart illustrating one example of a method for updating the current valid UEFI images and drivers with new valid UEFI images and drivers, according to one or more embodiments.

FIG. 6 illustrates a method for updating the current validated UEFI images and drivers with new validated UEFI images and drivers. Method 600 begins at the start block and proceeds to decision block 602 where processor 102 determines if a current validated UEFI image and/or driver are to be updated with new validated UEFI images and drivers. In one embodiment, a system user or administrator can provide user input to elect to update the current validated UEFI images and drivers with new validated UEFI images and drivers. In response to the current validated UEFI image and driver not being updated, method 600 ends. In response to a current validated UEFI image and/or driver being updated, processor 102 receives new UEFI images and/or drivers (block 604). Processor 102 can receive the new UEFI images and drivers via ports, pins and adaptors 130 or via network 170. Processor 102 determines if the received UEFI image and/or UEFI driver are authentic using a secure boot process or policy (decision block 606). The secure boot policy uses a set of public keys to authenticate the UEFI images and drivers. Only UEFI images and drivers that satisfy the secure boot policy are designated to be authentic. In response to all of the UEFI images and/or drivers not being authenticated, processor 102 generates an error message and stores the error message to error log 310 (block 608). Method 600 then ends.

In response to all of the new UEFI images and/or drivers being authenticated, processor 102 identifies the new UEFI images and drivers as known new valid UEFI images and drivers (block 610). Processor 102 generates a hash of each of the new validated UEFI images and/or drivers and associates the hash with their respective new validated UEFI images and drivers (block 612). At block 614, processor 102 replaces the previously validated UEFI images, drivers and hashes with the new valid UEFI images, drivers and associated hashes to NV memory 139 as validated UEFI images and drivers 336 (i.e. UEFI images 340/hash 342, UEFI driver A 344/hash 346, and UEFI driver C 352/hash 354). The new valid UEFI images, drivers and hashes are stored to secure storage device 139. Method 600 concludes at the end block.

Figure 7:
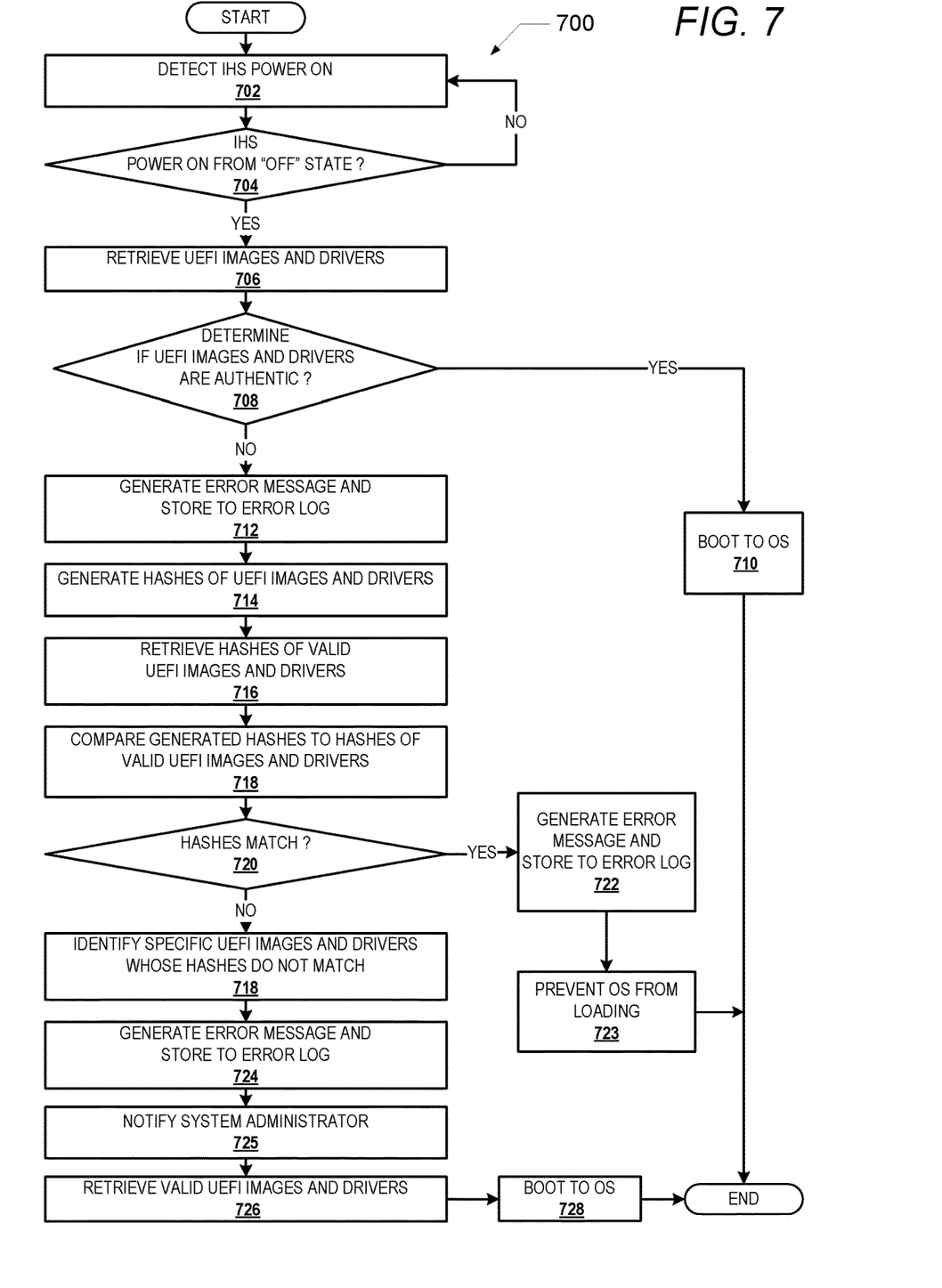
FIG. 7 is a flow chart illustrating one example of a method for recovering an IHS from a secure boot authentication failure, according to one or more embodiments.

FIG. 7 illustrates a method for recovering an IHS from a secure boot authentication failure. Method 700 begins at the start block and proceeds to block 702 where processor 102 detects that IHS 100 has been powered on such that the processor and other functional components receive a full complement of power required to operate. The powering on of the IHS to an operational state can occur from one of at least two possible non-operational states. In at least one embodiment, the IHS 100 can be booted up entirely from an off state, in which a start-up and authentication protocol is required to load the operating system before the IHS can function. Alternatively, the IHS 100 can be activated from a low power state, such as a sleep or hibernation state, in which the previously authenticated operating system is re-activated without requiring another authentication process.

At decision block 704, processor 102 determines if the powering on of IHS 100 involved powering on (i.e., providing system power to the components of IHS 100) from an off state. In response to IHS 100 not being powered on from an off state (i.e., power on from a low power state that does not require reloading and re-authentication of the OS), method 700 returns to block 702 to continue detecting a power on condition that occurs from an off state of the IHS 100.

In response to IHS 100 being powered on from an off state, processor 102 retrieves non-validated UEFI images 330 from NV memory 139, UEFI driver 222 from NV memory 220 and UEFI driver 262 from NV memory 260 (block 706). Processor 102 determines if the retrieved UEFI images and drivers are authentic using a secure boot process or policy (decision block 708). The secure boot policy uses a set of public keys to authenticate the UEFI images and drivers. Only UEFI images and drivers that satisfy the secure boot policy are designated to be authentic. In response to all of the UEFI images 330 and drivers 222 and 262 being authenticated, processor 102 loads or boots UEFI images 330 and drivers 222 and 262 with OS 304 (block 710). Method 700 then ends.

In response to one or more of the UEFI images and drivers not being authenticated, processor 102 generates a first type error message and stores the first type error message to error log 310 (block 712). The first type error message includes the identity of the UEFI images and/or drivers that have failed authentication. In one embodiment, processor 102 generates hashes 312 of all of the UEFI images 330 and UEFI drivers 222 and 262 (block 714). In another embodiment, processor 102 generates hashes 312 of only the UEFI images and/or drivers that have failed authentication. Processor 102 retrieves the hashes 342, 346 and 354 corresponding to validated UEFI images 340 and UEFI drivers 344 and 352 (block 716). Processor 102 compares the generated hashes 312 to retrieved hashes 342, 346 and 354 of valid UEFI images and drivers (block 718). The purpose of the hash comparison is to identify which of the UEFI images and/or drivers failed validation. Processor 102 determines if the generated hashes 312 match the retrieved hashes 342, 346, and 354 of valid UEFI images and drivers (decision block 720).

In response to all of the hashes matching, processor 102 generates a second type error message and stores the second type error message to error log 310 (block 722). The second type error message includes the identity of the UEFI images and/or drivers that have failed authentication, but have passed validation (hashes matching). Processor 102 prevents loading or booting to the OS (block 723). Processor 102 does not load or boot to the OS, since the UEFI images and drivers are not authentic. Method 700 then ends. In response to at least one of the hashes not matching, Processor 102 identifies the specific UEFI images and/or drivers whose hashes did not match (i.e. that have failed validation) (block 721). Processor 102 generates a third type error message and stores the third type error message to error log 310 (block 724). The third type error message includes the identity of the UEFI images and/or drivers that have failed authentication and have failed validation (hashes not matching). The second and third type error message indicates that some type of tampering has occurred to one or more UEFI image and/or drivers. Processor 102 sends a notice to a system administrator that a secure boot authentication failure has occurred (block 725). In one embodiment, the specific image or driver that has been tampered with is identified within the notice. Alternatively, or in conjunction, the administrator may receive a general error notification and determine the specifics of the error by assessing the stored error log. The error log can contain one or more of the first, second or third type error messages. For those UEFI images and drivers whose hashes did not match one of the previously validated hashes (342, 346, and 354), processor 102 retrieves one or more of the previously validated UEFI images and/or drivers (i.e. UEFI images 340 and UEFI drivers 344 and 352) from NV memory 139 (block 726). Thus, in this embodiment, only the UEFI images and drivers whose hashes did not match one of the previously validated hashes (342, 346, and 354) have their corresponding validated UEFI images and drivers retrieved. The hash comparison (block 718) is completed to determine whether the retrieved images and/or drivers (i.e. UEFI images 330 and UEFI drivers 222 and 262) are different than the previously validated images and/or drivers (i.e. UEFI images 340 and UEFI drivers 344 and 352). If the two drivers are different (i.e. the retrieved images and/or drivers have been tampered), the previously validated images and/or drivers (i.e. UEFI images 340 and UEFI drivers 344 and 352) are used instead. Processor 102 loads or boots at least one of the previously validated UEFI images 340 and UEFI drivers 344 and 352 with OS 304 (block 728). Method 700 concludes at the end block.

Figure 8:
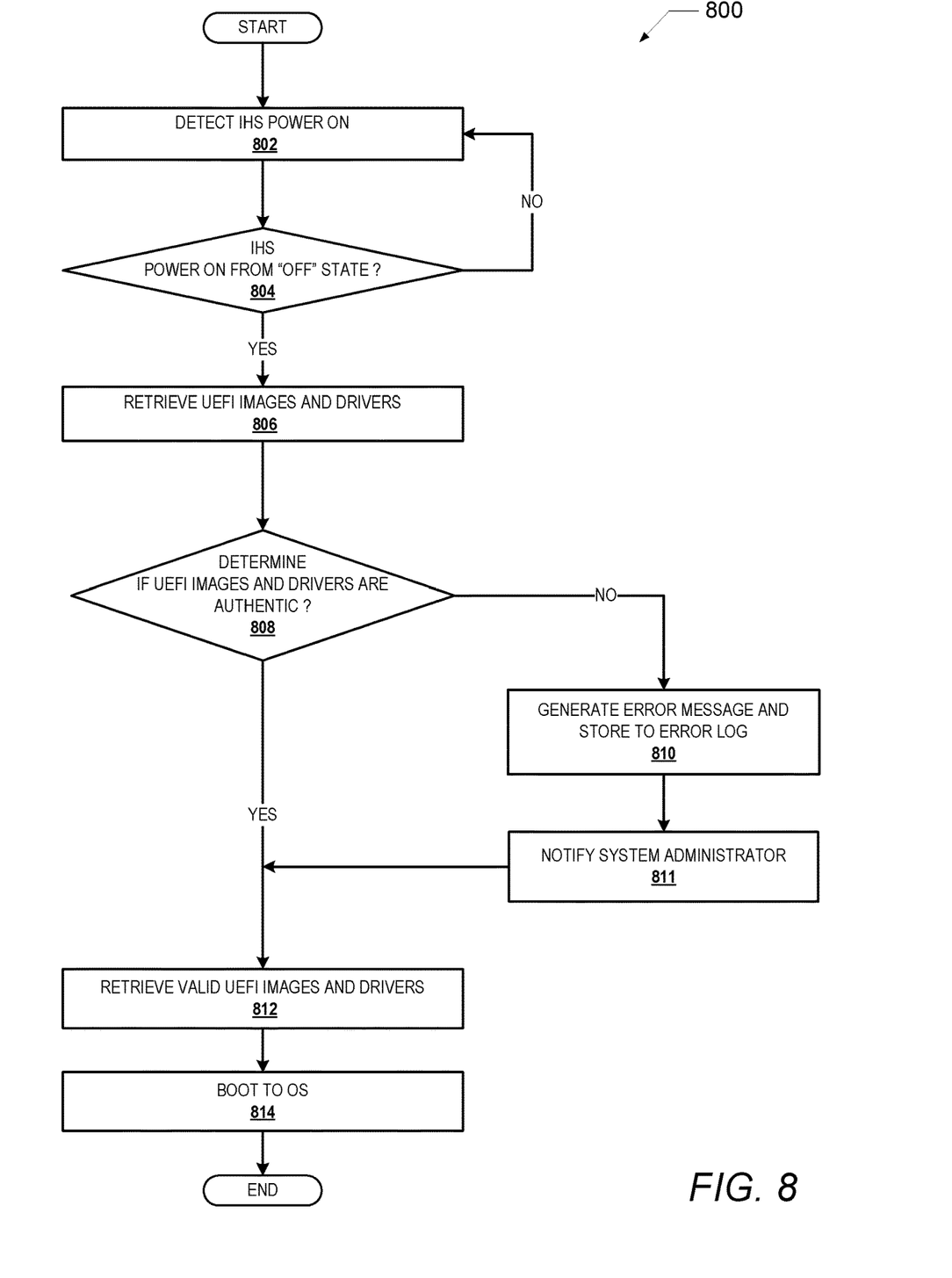
FIG. 8 is a flow chart illustrating another example of a method for recovering an IHS from a secure boot authentication failure according to one or more embodiments.

FIG. 8 illustrates another method for recovering an IHS from a secure boot authentication failure. Method 800 begins at the start block and proceeds to block 802 where processor 102 detects that IHS 100 has been powered on such that the processor and other functional components receive a full complement of power required to operate.

At decision block 804, processor 102 determines if the powering on of IHS 100 involved powering on (i.e., providing system power to the components of IHS 100) from an off state. In response to IHS 100 not being powered on from an off state (i.e., power on from a low power state that does not require reloading and re-authentication of the OS), method 800 returns to block 802 to continue detecting a power on condition that occurs from an off state of the IHS 100.

In response to IHS 100 being powered on from an off state, processor 102 retrieves UEFI images 330 from NV memory 139, UEFI drivers 222 and 224 from storage NV memory 220 and UEFI drivers 262 and 264 from NID NV memory 260 (block 806). Processor 102 determines if the retrieved UEFI images and drivers are authentic using a secure boot process or policy (decision block 808). The secure boot policy uses a set of public keys to authenticate the UEFI images and drivers. Only UEFI images and drivers that satisfy the secure boot policy are designated to be authentic. In response to at least one of the non-validated UEFI images and/or drivers not being authenticated, processor 102 generates an error message and stores the error message to error log 310 (block 810).

Processor 102 sends a notice to a system administrator that a secure boot authentication failure has occurred (block 811). In one embodiment, the specific image or driver that has been tampered with is identified within the notice. Alternatively, or in conjunction, the administrator may receive a general error notification and determine the specifics of the error by assessing the stored error log. After blocks 808 and 811, processor 102 retrieves all of the previously validated UEFI images and drivers (i.e. UEFI images 340 and UEFI drivers 344 and 352) from NV memory 139 (block 812). Processor 102 loads or boots the previously validated UEFI images 340 and UEFI drivers 344 and 352 with OS 304 (block 814). Method 800 then terminates.

In the above described flow chart, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A computer implemented method for recovering an information handling system (IHS) from a secure boot authentication failure, the method comprising:

retrieving, via a processor from a first memory device during a boot operation of the IHS, a current first unified extensible firmware interface (UEFI) driver associated with a first component/device of the IHS;

in response to a secure boot process being enabled during a driver execution environment (DXE) phase of the boot operation, determining, via the secure boot process, if the first UEFI driver is an authenticated UEFI driver, the secure boot process comprising using a set of public keys stored in firmware to authenticate the first UEFI driver, and the secure boot process preventing loading of drivers or images that are not signed with an acceptable digital signature;

in response to determining that the first UEFI driver is an authenticated driver, loading the first UEFI driver, wherein if the secure boot process is not enabled, an authentication check of the UEFI driver is not performed during the DXE phase prior to loading the UEFI driver;

in response to determining that the first UEFI driver is not an authenticated UEFI driver, retrieving a previously validated UEFI driver corresponding to the first component/device and loading the previously validated UEFI driver;

determining if a current validated UEFI driver is to be updated with a new validated UEFI driver; and in response to a current validated UEFI image and/or driver being updated: receiving new UEFI images and drivers; determining if the received UEFI image and/or UEFI driver are authentic using a secure boot process; and in response to all of the new UEFI images and drivers being authenticated, identifying the new UEFI images and drivers as known new valid UEFI images and drivers.

2. The method of claim 1, further comprising:

in response to determining that the first UEFI driver is an authenticated driver, identifying the first UEFI driver as a known, new valid UEFI driver, generating a hash of the first UEFI driver, associating the hash with its respective new validated UEFI driver, replacing a previously validated UEFI driver and hash with the new valid UEFI driver and associated hash as a validated UEFI driver within non-volatile storage; and in response to determining that the first UEFI driver is not an authenticated driver: generating a first type error message that includes an identity of UEFI drivers that have failed authentication; and storing the first type error message in an error log within non-volatile storage.

3. The method of claim 1, further comprising determining whether the previously validated UEFI driver is to be retrieved and loaded by:

generating a first hash of the first UEFI driver;
retrieving a second hash associated with the previously validated UEFI driver;
determining if the first hash and the second hash match; and
in response to the first hash and the second hash not matching:
  generating a third type error message and storing the third type error message to an error log, the third type error message including an identify of the first UEFI driver that has failed authentication and failed validation, indicating that some type of tampering has occurred to the first UEFI driver; and
  initiating the retrieving and loading of the previously validated UEFI driver.

4. The method of claim 3, further comprising:

in response to the first hash and the second hash matching:
  generating a second type error message that includes an identity of the UEFI driver that has failed authentication but passed validation;
  storing the second type error message to an error log; and
  preventing the IHS from booting to the operating system.

5. The method of claim 1, further comprising:

during a provisioning process of the IHS:
  identifying a provided UEFI driver as the previously validated UEFI driver on the second memory device;
  generating the second hash from the provided UEFI driver;
  associating the second hash with the previously validated UEFI driver; and
  storing the previously validated UEFI driver and the second hash to a non-volatile memory device.

6. The method of claim 5, further comprising:

determining if the previously validated UEFI driver is to be updated with a new validated UEFI driver;

in response to determining that the previously validated UEFI driver is to be updated, identifying the new validated UEFI driver;
generating a third hash from the new validated UEFI driver;
associating the third hash with the new validated UEFI driver; and
replacing the previously validated UEFI driver and second hash with the new validated UEFI driver and the third hash to the non-volatile memory device.

7. The method of claim 1, further comprising:

retrieving the first UEFI image from a first non-volatile memory device during the boot operation;
retrieving, from a second non-volatile memory device, a previously validated UEFI image corresponding to the first UEFI image and loading the previously validated UEFI image and its associated hash to system memory.

8. An information handling system (IHS) comprising:

a first IHS component having a first memory device; and
a processor communicatively coupled to a second memory device, the processor further communicatively coupled to the first IHS component and the first memory device, the processor having firmware executing thereon for recovering the IHS from a secure boot authentication failure, wherein the firmware configures the processor to:
  retrieve from the first memory device during a boot operation of the IHS, a current first unified extensible firmware interface (UEFI) driver associated with a first component/device of the IHS;
  in response to a secure boot process being enabled during a driver execution environment (DXE) phase of the boot operation, determine, via the secure boot process, if the first UEFI driver is an authenticated UEFI driver, the secure boot process comprising using a set of public keys stored in firmware to authenticate the first UEFI driver, and the secure boot process preventing a loading of drivers or images that are not signed with an acceptable digital signature;
  in response to determining that the first UEFI driver is an authenticated driver, load the first UEFI driver, wherein if the secure boot process is not enabled, an authentication check of the UEFI driver is not performed during the DXE phase prior to loading the UEFI driver;
in response to determining that the first UEFI driver is not an authenticated UEFI driver, retrieve a previously validated UEFI driver corresponding to the first component/device and loading the previously validated UEFI driver;
  determine if a current validated UEFI driver is to be updated with a new validated UEFI driver; and
  in response to a current validated UEFI image and/or driver being updated: receive new UEFI images and drivers; determine if the received UEFI image and/or UEFI driver are authentic using a secure boot process; and in response to all of the new UEFI images and drivers being authenticated, identify the new UEFI images and drivers as known new valid UEFI images and drivers.

9. The information handling system of claim 8, wherein the firmware further configures the processor to:

in response to determining that the first UEFI driver is an authenticated driver, identify the first UEFI driver as a known, new valid UEFI driver, generate a hash of the first UEFI driver, associating the hash with its respective new validated UEFI driver, replace a previously validated UEFI driver and hash with the new valid UEFI driver and associated hash as a validated UEFI driver within non-volatile storage; and in response to determining that the first UEFI driver is not an authenticated driver: generate a first type error message that includes an identity of UEFI drivers that have failed authentication; and store the first type error message in an error log within non-volatile storage.

10. The information handling system of claim 8, wherein the firmware further configuring the processor to determine whether the previously validated UEFI driver is to be retrieved and loaded by configuring the processor to:

generate a first hash of the first UEFI driver;
retrieve a second hash associated with the previously validated UEFI driver;
determine if the first hash and the second hash match; and
in response to the first hash and the second hash not matching:
generate a third type error message and store the third type error message to an error log, the third type error message including an identify of the first UEFI driver that has failed authentication and failed validation, indicating that some type of tampering has occurred to the first UEFI driver; and
initiate the retrieving and loading of the previously validated UEFI driver.

11. The information handling system of claim 10, wherein the firmware further configures the processor to:

in response to the first hash and the second hash matching:
generate a second type error message that includes an identity of the UEFI driver that has failed authentication but passed validation;
store the second type error message to an error log; and
prevent the IHS from booting to the operating system.

12. The information handling system of claim 8, wherein the firmware further configures the processor to:

during a provisioning process of the IHS:
identify a provided UEFI driver as the previously validated UEFI driver on the second memory device;
generate the second hash from the provided UEFI driver;
associate the second hash with the previously validated UEFI driver; and
store the previously validated UEFI driver and the second hash to a non-volatile memory device.

13. The information handling system of claim 12, wherein the firmware further configures the processor to:

determine if the previously validated UEFI driver is to be updated with a new validated UEFI driver;
in response to determining that the previously validated UEFI driver is to be updated, identify the new validated UEFI driver;
generate a third hash from the new validated UEFI driver;
associate the third hash with the new validated UEFI driver; and
replacing the previously validated UEFI driver and second hash with the new validated UEFI driver and the third hash to the non-volatile memory device.

14. The information handling system of claim 8, wherein the firmware further configures the processor to:

retrieve the first UEFI image from a first non-volatile memory device during the boot operation; and
retrieve from a second non-volatile memory device, regardless of whether the first UEFI image is or is not an authenticated image, a previously validated UEFI image corresponding to the first UEFI image and loading the previously validated UEFI image and its associated hash to system memory.

15. A recovery system for recovering an information handling system (IHS) from a secure boot authentication failure, the recovery system comprising:

a first IHS component having a first non-volatile memory device; and
a processor communicatively coupled to a second memory device, the processor further communicatively coupled to the first IHS component and the first non-volatile memory device, the processor having firmware executing thereon for recovering the IHS from a secure boot authentication failure, wherein the firmware configures the processor to:
retrieve from the first non-volatile memory device during a boot operation, a current first unified extensible firmware interface (UEFI) driver associated with the first component of the IHS;
in response to a secure boot process being enabled during a driver execution environment (DXE) phase of the boot operation, determine, via the secure boot process, if the first UEFI driver is an authenticated UEFI driver, the secure boot process comprising using a set of public keys stored in firmware to authenticate the first UEFI driver, and the secure boot process preventing a loading of drivers or images that are not signed with an acceptable digital signature;
in response to determining that the first UEFI driver is an authenticated driver, load the first UEFI driver, wherein if the secure boot process is not enabled, an authentication check of the UEFI driver is not performed during the DXE phase prior to loading the UEFI driver;
in response to determining that the first UEFI driver is not an authenticated UEFI driver, retrieve a previously validated UEFI driver corresponding to the first component/device and loading the previously validated UEFI driver;
determine if a current validated UEFI driver is to be updated with a new validated UEFI driver; and
in response to a current validated UEFI image and/or driver being updated: receive new UEFI images and drivers; determine if the received UEFI image and/or UEFI driver are authentic using a secure boot process; and in response to all of the new UEFI images and drivers being authenticated, identify the new UEFI images and drivers as known new valid UEFI images and drivers.

16. The recovery system of claim 15, wherein the firmware further configures the processor to:

in response to determining that the first UEFI driver is an authenticated driver, identify the first UEFI driver as a known, new valid UEFI driver, generate a hash of the first UEFI driver, associating the hash with its respective new validated UEFI driver, replace a previously validated UEFI driver and hash with the new valid UEFI driver and associated hash as a validated UEFI driver within non-volatile storage, and load the first UEFI driver; and
in response to determining that the first UEFI driver is not an authenticated driver: generate a first type error message that includes an identity of UEFI drivers that have failed authentication; and store the first type error message in an error log within non-volatile storage.

17. The recovery system of claim 15, wherein determining whether the previously validated UEFI driver is to be retrieved and loaded comprises the firmware further configuring the processor to:
  generate a first hash of the first UEFI driver;
  retrieve, from the second memory device, a second hash associated with the previously validated UEFI driver;
  determine if the first hash and the second hash match; and
  in response to the first hash and the second hash not matching:
    generate a third type error message and store the third type error message to an error log, the third type error message including an identify of the first UEFI driver that has failed authentication and failed validation, indicating that some type of tampering has occurred to the first UEFI driver; and
    initiate the retrieving and loading of the previously validated UEFI driver.

18. The recovery system of claim 17, wherein the firmware further configures the processor to:
  in response to the first hash and the second hash matching:
    generate a second type error message that includes an identity of the UEFI driver that has failed authentication but passed validation;
    store the second type error message to an error log; and
    prevent the IHS from booting to an operating sytem.

19. The recovery system of claim 15, wherein the firmware further configures the processor to:
  during a provisioning process of the IHS:
    identify a provided UEFI driver as the previously validated UEFI driver on the second memory device;
    generate the second hash from the provided UEFI driver;
    associate the second hash with the previously validated UEFI driver; and
    store the previously validated UEFI driver and the second hash to a non-volatile memory device.

20. The recovery system of claim 19, wherein the firmware further configures the processor to:
  determine if the previously validated UEFI driver is to be updated with a new validated UEFI driver;
  in response to determining that the previously validated UEFI driver is to be updated, identify the new validated UEFI driver;
  generate a third hash from the new validated UEFI driver;
  associate the third hash with the new validated UEFI driver; and
  replace the previously validated UEFI driver and second hash with the new validated UEFI driver and the third hash to the non-volatile memory device.

* * * * *